United States Patent
Kneissler et al.

(10) Patent No.: US 8,600,612 B2
(45) Date of Patent: Dec. 3, 2013

(54) METHOD FOR DETERMINING WEAR OF A FRICTION PLATE

(71) Applicant: Schaeffler Technologies AG & Co. KG, Herzogenaurach (DE)

(72) Inventors: Markus Kneissler, Buehlertal (DE); Patrick Schieferdecker, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/785,540

(22) Filed: Mar. 5, 2013

(65) Prior Publication Data

US 2013/0179030 A1 Jul. 11, 2013

Related U.S. Application Data

(63) Continuation of application No. PCT/DE2011/001570, filed on Aug. 10, 2011.

(30) Foreign Application Priority Data

Sep. 9, 2010 (DE) .......................... 10 2010 044 882

(51) Int. Cl.
*G01M 17/00* (2006.01)
(52) U.S. Cl.
USPC ............. 701/33.8; 701/32.8; 701/34.4; 703/2
(58) Field of Classification Search
USPC ........... 701/29.1, 31.9, 32.1, 32.8, 33.7, 33.8, 701/34.4; 703/2
See application file for complete search history.

(56) References Cited

U.S. PATENT DOCUMENTS

| | | | | |
|---|---|---|---|---|
| 7,286,922 B1* | 10/2007 | Fischer et al. | .................. | 701/51 |
| 7,603,220 B2* | 10/2009 | Jaeggle et al. | .................. | 701/69 |
| 2004/0260444 A1* | 12/2004 | Winkelmann et al. | .......... | 701/67 |
| 2010/0048351 A1* | 2/2010 | Sayman | .......................... | 477/80 |
| 2010/0113218 A1 | 5/2010 | Herter et al. | | |

FOREIGN PATENT DOCUMENTS

| | | |
|---|---|---|
| DE | 102007061266 | 7/2008 |
| DE | 102007020119 | 10/2008 |
| EP | 1557581 | 7/2005 |
| EP | 2192319 | 6/2010 |

* cited by examiner

*Primary Examiner* — Russell Frejd
(74) *Attorney, Agent, or Firm* — Simpson & Simpson, PLLC

(57) ABSTRACT

Method for determining wear of a friction plate of an automatically actuated friction clutch, particularly in a motor vehicle driven by an internal combustion engine, wherein initially at a prescribed clutch slip and a prescribed clutch torque in an earlier friction lining test point an earlier clutch actuation travel is determined and stored, later again at the prescribed clutch slip and the prescribed clutch torque in a later friction lining test point a later clutch actuation travel is determined, thereafter the earlier clutch actuation travel and the later clutch actuation travel are compared to each other and a differential value is determined, and thereafter a friction lining wear is determined using the differential value, in order to reliably determine friction lining wear in a time interval and with only little effort, so that a depreciation of function due to a worn friction lining can be prevented in a timely manner.

10 Claims, 2 Drawing Sheets

METHOD FOR DETERMINING WEAR OF A FRICTION PLATE

CROSS-REFERENCE TO RELATED APPLICATIONS

This application is filed under 35 U.S.C. §120 and §365(c) as a continuation of International Patent Application No. PCT/DE2011/001570 filed Aug. 10, 2011, which application claims priority from German Patent Application No. 10 2010 044 882.6 filed Sep. 9, 2010, which applications are incorporated herein by reference in their entirety.

TECHNICAL FIELD

The invention relates to a method for determining wear of a friction plate of an automatically actuated friction clutch, in particular in a motor vehicle driven by an internal combustion engine.

BACKGROUND

Within the framework of the present application, "friction clutch" is understood to mean in particular a friction clutch which is situated in the drivetrain of motor vehicles driven by an internal combustion engine, between the combustion engine and a transmission, which enables driving off as well as changing the gear ratio, and which for technical reasons is only possible when the traction force is interrupted.

Such friction clutches have an input part and an output part, and transmission of power increases depending on actuation, starting from a completely disengaged actuating position in which essentially no power is transmitted between the input and output parts, all the way to a completely engaged actuating position in which transmission of power between the input and output parts is essentially complete, where transmission of power between the input and output parts occurs by frictional engagement. Conversely, starting from a completely engaged actuating position, in which transmission of power between the input and output parts is essentially complete, all the way to a completely disengaged actuating position, in which essentially no power is transmitted between the input and output parts, depending on actuation a decrease in power transmission occurs.

Such friction clutches are also implemented as dual clutches, and then on the combustion engine side have an input part and on the transmission side a first and a second output part, each of which includes a clutch plate. With a dual clutch, the input part on the one hand and the first output part and/or the second output part on the other hand can be connected with each other or separated from each other. Furthermore, during the transition of a gear change, a flow of power from the input part can be transferred from the first output part to the second output part and vice versa.

It is known to actuate such friction clutches automatically by means of an actuator device, which includes at least one electrical or hydraulic actuator. The actuator device is usually controlled by means of a control device based on characteristic curves and/or parameters which are stored in the control device, and/or which are made available by means of sensors.

The friction clutch can disengage under spring loading and engage by means of the actuating device, or conversely can engage under spring loading and disengage by means of the actuating device. The actuating device can be operated using pressure or tension.

The thickness of the clutch lining is usually designed for the life of a vehicle. In the case of increased wear and early erosion of the lining, the point at which the limits of the lining has been reached is not noticed until the lining has completely worn down, for example acoustically by a scraping rivet of the clutch plate or by lack of torque capacity of the clutch. As a rule, early diagnosis is only possible by means of disassembly and visual inspection, and this is too complicated and too expensive for merely determining the thickness of the clutch lining.

A device which enables simple evaluation and works reliably to detect the operating condition of a friction lining on a friction lining carrier, in particular in the environment of a motor vehicle, is disclosed by DE 10 2007 061 266 A1. There, it proposes to provide at least one olfactorily active substance for recognizing the operating condition of the friction lining. However, the precision with which the operating condition of the friction clutch can be determined using this device depends upon how precisely the olfactorily active substance is situated in or on the friction lining, and how precisely the olfactory information is evaluated.

The descriptive introduction to DE 10 2007 061 266 A1 also mentions a mechanical structure for determining clutch plate wear, as well as an indication of wear by means of electronic sensors. It is also mentioned that wear of friction linings can be determined from a model calculation, by totaling up the energy introduced into the friction system over its operating life and deducing the present operating condition of the friction lining in connection with experimentally determined data on the wear of a friction lining. However, these types of wear determination are either very complex, or do not satisfy elevated demands for precision.

BRIEF SUMMARY

The invention is therefore based on the object of providing a method named at the beginning, whereby friction wear in a time interval can be determined reliably and with only a little effort, so that a depreciation of function due to a worn friction lining can be prevented in a timely manner.

The object is fulfilled by a method having the steps of first determining and storing an earlier clutch actuation distance at a predetermined clutch slip and a predetermined clutch torque in an earlier friction lining test point, later again determining a later clutch actuation distance at the predetermined clutch slip and the predetermined clutch torque at a later friction lining test point, subsequently comparing the earlier clutch actuation distance and the later clutch actuation distance with each other and determining a differential value, and then determining friction lining wear taking the differential value into account. This makes it possible to reliably determine friction lining wear and with high precision, without need of disassembly and visual inspection.

Especially preferable embodiments and refinements of the method according to the invention are the subject of the dependent claims.

The friction lining wear is preferably determined using a translation ratio of a clutch actuating device. Starting from an actuator, a movement is achieved at the clutch by means of a kinematic connection subject to translation. The translation ratio of the clutch actuating device is determined from the movement of the actuator relative to the movement at the clutch achieved thereby. Inclusion of the translation ratio of the clutch actuating device makes it possible to determine the wear of the friction lining from the perspective of the actuator, in particular on the basis of the actuator travel.

It is very expedient if an absolute friction lining wear or a remaining friction lining thickness is determined using a friction lining thickness in the new condition. That makes it possible to determine not only wear that has occurred, but also to report and/or store information about remaining friction lining thickness in a timely manner and/or to generate, report and/or store a prognosis about remaining residual clutch life.

According to a preferred refinement of the invention, a spring effect of the friction lining is included in determining the friction lining wear. This is necessary in particular to increase the precision when the friction lining test point lies within an area in which an elastic friction lining is only partially compressed.

It has proven to be very advantageous if different factors of influence are incorporated if appropriate in each case when approaching the earlier friction lining test point and when approaching the later friction lining test point. In particular, external influence factors are included, such as temperature or wear of the friction linings, which in a hydraulic clutch disengaging system result in the volume of a pressure medium varying, for example in a master cylinder when a connecting opening to a non-pressurized readjustment container, known as a sniffing hole, is utilized to equalize pressure.

Particularly preferred is a refinement of the method according to the invention in which the earlier friction lining test point and the later friction lining test point are test points that are moved to anyway, such as contact points. The term contact point designates a point in a diagram at which the clutch transmission torque is plotted depending on the clutch actuation travel, at which friction surfaces of the clutch begin to transmit a torque. In the present case, the contact point is located at a clutch transmission torque of 1-10 Nm, in particular at a clutch transmission torque of approximately 5 Nm. Since the contact point changes in the course of operation of the vehicle, for example over the long term due to the wear of the clutch, in particular of the friction linings of the clutch plate, and of the actuating elements; and in the short term due to parameters that change rapidly during operation, such as temperature, whereby the actuation distances and because of the different expansion coefficients of the materials the positions of the clutch components relative to the friction linings of the clutch plate change, the contact point must in any case be recalculated regularly. That makes it possible to avoid a separate detection of a friction lining test point.

According to another likewise preferred refinement of the method according to the invention, the earlier friction lining test point and the later friction lining test point are test points that are approached specifically to determine friction lining wear. That makes it possible to choose a friction lining test point at a clutch actuation position that is optimal for this purpose, in particular in an area in which an elastic friction lining is at least almost completely compressed.

It is very expedient if a remaining clutch life is determined using the ascertained friction lining wear and the mileage traveled by the motor vehicle. It has proven beneficial to deliver and/or store an appropriate notification when a predetermined friction lining wear is exceeded. That makes it possible to service the clutch at an appropriate time.

In a particularly advantageous refinement of the method according to the invention, a first earlier friction lining test point, a first later friction lining test point and from them a first differential value, as well as a second earlier friction lining test point, a second later friction lining test point and from them a second differential value are determined, and friction lining wear is determined using the first differential value and the second differential value. The friction lining elasticity of the entire clutch plate can be determined based on a difference between the first differential value and the second differential value. In the event of a convergence of the ascertained friction lining thicknesses from a first friction lining test point, such as the contact point, and a second friction lining test point, such as a special friction lining test point, for example, this information makes it possible to detect that the friction lining elasticity is wearing and losing its elastic effect. In the event of enlargement of these ascertained thicknesses, it can be determined that there is thermal distortion and increased elasticity of the friction plate.

BRIEF DESCRIPTION OF THE DRAWINGS

Especially preferred refinements of the method according to the invention will be explained below with reference to figures; the figures show the following schematically and by way of example.

DETAILED DESCRIPTION

Figure 1:
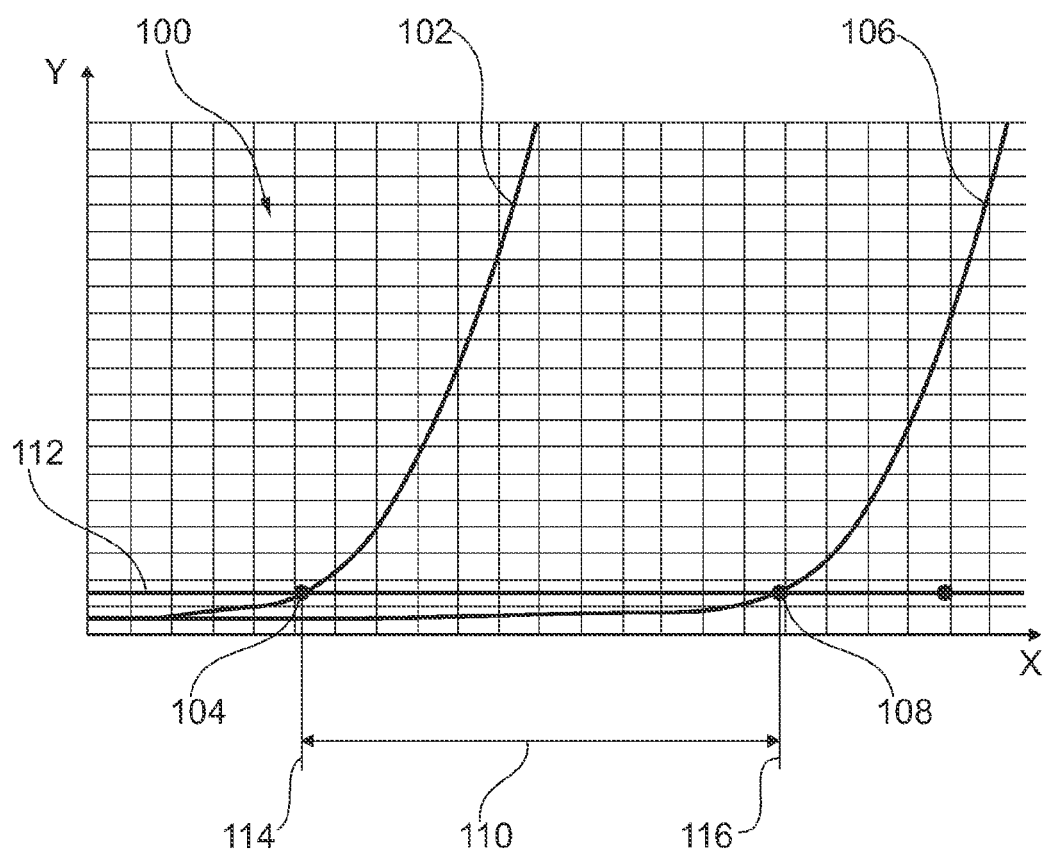
FIG. 1 is a diagram which depicts clutch transmission torque with a friction lining test point for a new clutch and for a used clutch, depending on clutch actuation travel; and, FIG. 2 is a diagram which depicts clutch transmission torque with a friction lining test point for a new clutch and for a used clutch, depending on clutch actuation travel.

Diagram 100 shown in FIG. 1 pertains to an automatically operated friction clutch of a motor vehicle driven by an internal combustion engine. The friction clutch is situated between the combustion engine and a transmission, and has an input part on the combustion engine side which includes a housing or cover, a pressure plate and an opposing pressure plate. The cover is rigidly connected to the opposing pressure plate, for example by riveting; the connection of the pressure plate is rotationally fixed but axially movable. On the transmission side, the clutch has an output part which includes at least one clutch plate with friction linings.

However, the friction clutch may also be a dual clutch having on the combustion engine side an input part that includes a housing or cover, a pressure plate, an intermediate pressure plate and an opposing pressure plate. On the transmission side the dual clutch has a first and a second output part, each of which includes at least one clutch plate. Although reference is made below to a single clutch, the invention may be applied equally well to a dual clutch.

A spring device which is braced against the housing on one side and against the pressure plate on the other side applies pressure to the pressure plate in the direction of clutch engagement. The clutch can be disengaged by means of an actuating mechanism that opposes the force of the lever spring. The actuation motion in the direction of disengagement applies pressure in the present case; however, according to a different exemplary embodiment the clutch may also be pulled open. The actuating mechanism includes an electrical, hydraulic, mechanical, electromechanical or electrohydraulic actuator, which is equipped with a measuring device. The measuring device makes it possible in particular to determine actuator travel, in particular by means of a direct measurement of travel in the actuator, for example of the piston travel in a hydrostatic actuator, or by means of an incremental travel measurement in an electric motor of an electromechanical or electrohydraulic actuating mechanism. The measuring device may also make it possible to determine pressure in a hydrostatic system. The actuating mechanism is controlled by means of a control device based on characteristic curves and/or parameters which are stored in the control device, and/or which are made available by means of sensors.

Diagram 100, shown in FIG. 1, depicts clutch characteristic curves 102 and 106. Here, the clutch actuation travel, in the present case the actuator travel, is plotted on the x axis, and the clutch transmission torque on the y axis. In the new condition, clutch actuation occurs in accordance with earlier clutch characteristic curve 102. With increasing actuation, corresponding to increasing x values, the pressure plate of the clutch is displaced in the direction of the opposing pressure plate, so that between the pressure plate and opposing pressure plate on the one hand and the clutch plate with friction linings on the other hand increasing friction develops, and along with it increasing clutch torque, corresponding to increasing y values.

Earlier friction lining test point 104 is established at predefined clutch torque 112. In the present case, contact point 104 at approximately 5 Nm is used as the earlier friction lining test point. In the new condition, earlier friction lining test point 104 is reached at earlier clutch actuation travel 114. The position of the contact point in reference to the actuator travel is adapted regularly. Because of wear, ever greater clutch actuation travel is necessary to reach a certain clutch transmission torque. In a worn state of the clutch, actuation of the clutch therefore occurs according to later clutch characteristic curve 106. Later friction lining test point 106, corresponding to the contact point at approximately 5 Nm, is then reached only at later clutch actuation travel 116.

The increase in the internal activation travel in the clutch until a clutch torque is built up, corresponding to the engagement travel, is recognized by means of the long-term adaptation of the contact point. Short-term adaptations, for example due to friction effects, are not taken into account for this purpose. Since the translation ratio between actuator and engagement or actuation travel of the clutch is constant, it is possible to ascertain the friction lining wear, or the change in thickness of the clutch plate, from change 110 in the requisite actuator travel 114, 116 until friction lining test point 104, 106, in the present case the contact point, possibly even from friction lining test point 104, 106 itself, over a certain time period, and from the translation ratio i between actuator and engagement travel, on the following basis:

$$\text{friction lining wear} = \frac{\text{clutch actuation travel}_{116} - \text{clutch actuation travel}_{114}}{i}$$

Changes in the properties of the friction lining elasticity are not detected when determining the friction lining wear by means of the contact point. Since the friction lining elasticity is typically not yet completely compressed in the area of the contact point, changes in friction lining thickness and friction lining elasticity cannot be completely separated.

Using a hydrostatic actuator may make it possible to determine the pure friction lining wear. It is possible here, along with the travel information, for example from absolute travel measurement of a master piston, to also measure the pressure in the hydrostatic system. With this actuator it is possible to specify a defined pressure on the clutch, so that the clutch is operated with a defined force and the friction lining elasticity is completely compressed, and thus no longer has any changeable influence on the thickness of the clutch plate.

Figure 2:
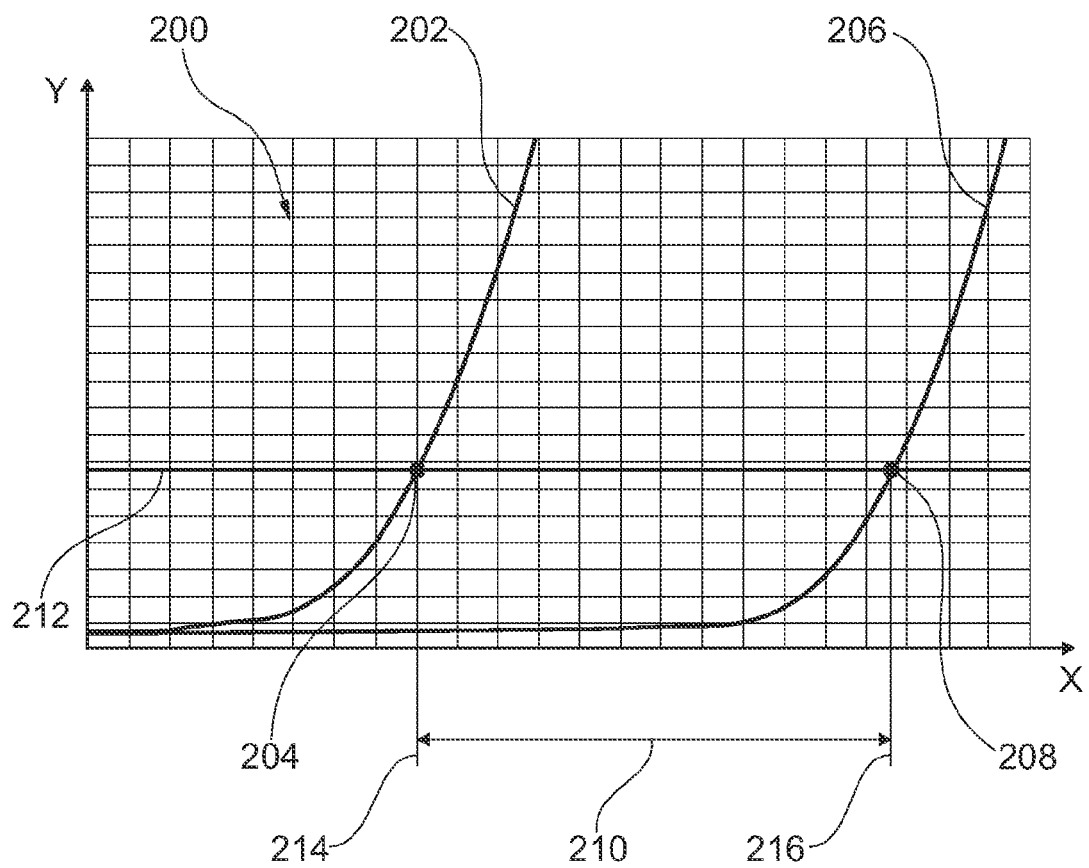

To determine the lining wear, distributed over the service life, friction lining test point 204, 208 may be approached at greater specified clutch torque 212 under a predetermined pressure, and actuator travel 214, 216 be measured by measuring the absolute travel of the master piston. The greater specified clutch torque 212 lies in a range in which the friction lining is at least almost completely compressed, in order to keep any influence from the elasticity of the latter small or to eliminate it. For example, greater specified clutch torque 212 is approximately 5-20 Nm, in particular approximately 12 Nm. This is depicted in Diagram 200 in FIG. 2, which shows earlier clutch characteristic curve 202 and later clutch characteristic curve 206. Thus also here a certain time period produces travel difference 210 in friction lining test position 204, 208, from which the friction lining thickness can then be determined with the help of the translation ratio i between actuator and engagement travel. We also refer to the above description, in particular to FIG. 1.

With a hydrostatic actuator, the long-term contact point adaptation does not take into account the short-term behavior of the hydraulic link, for example thermal expansion. For the determination or comparison of friction lining test points 204, 208 over the service life, it is therefore desirable if the hydraulic link always has the same properties. It is therefore desirable to balance out the hydraulic link by a so-called sniffing procedure prior to every determination of friction lining test point 204, 208.

To determine the absolute wear, it is important on the one hand to know the thickness of the friction lining in the new condition, for example from clutch design or construction data, and on the other hand to determine and store contact point 104 or friction lining test point 204 in the new condition, for example in a higher-level control unit. If these two values are known, and the translation ratio i between actuator and engagement travel according to the system design, the previous friction lining wear and the remaining friction lining thickness can be determined at any time over the service life. Together with the mileage of the vehicle, an estimate of remaining mileage can be made when the driving profile remains the same.

The contact point is determined continuously in the software, and can be stored or read out regularly. There is usually no provision for approaching friction lining test point 204, 206 in the normal driving strategy. For example, in normal driving operation a certain pressure point of the clutch which is passed in quick sequence after a sniffing procedure can be stored, or friction lining test point 204, 206 is approached manually, preferably during servicing.

Knowledge of the friction lining thickness can be utilized in particular for the following functions: through observation of contact point 104, 108 or regular approaching of friction lining test point 204, 208, for example at 70-99%, in particular at approximately 90% of the theoretical friction lining wear, an entry can be made in the error memory of the vehicle, so that replacement of the clutch plate can be planned on the occasion of the next service.

The friction lining wear or the remaining lining thickness are stored regularly in normal driving operation, for example every 10,000 km, or are stored by the repair shop at the time of service by approaching friction lining test point 204, 208. That can be used, for example, to give a residual service life or to recommend replacement.

The remaining friction lining thickness is reported to the driver as a notification in the vehicle diagnosis, similar to a notification of brake lining thickness.

Comparison with the mileage of the vehicle can give the driver, the repair shop or even the manufacturer information about the use of the vehicle. The energy introduced into the clutches can also be used here as the element for comparison. That makes it possible to say whether the vehicle is being moved in accordance with the design, or whether it is being driven in a manner that is gentler or harder on the clutch.

If a difference arises over the life of the clutch between contact point change 110 and friction lining test point change 210, this difference can be the basis for drawing conclusions about the friction lining elasticity of the clutch plate as a whole. This information makes it possible to recognize, for example, when approaching the thicknesses found from contact point 104, 108 and friction lining test point 204, 208; that the friction lining elasticity is wearing and losing its springiness. In the case of enlarging these ascertained thicknesses, thermal distortion and increased elasticity of the friction plate can be assumed. The refinements of the method according to the invention according to FIG. 1 and FIG. 2 can therefore be combined entirely or in part.

To determine the absolute friction lining thickness, an initial measurement of friction lining test point 204 or a determination of contact point 104 in the new condition is necessary. The designed friction lining thickness in the new condition can be assigned to this friction lining test point 204 or initial contact point 104. Both values can be learned (friction lining test point or contact point) or input (friction lining thickness) as part of an end-of-line (EOL) routine, and then stored in a control device.

To increase the precision of the determination of friction lining test point 104, 108, 204, 208, it is advisable to determine friction lining test point 104, 108, 204, 208 multiple times with a prior sniffing procedure and then obtain a mean value. Since the sniffing groove can be closed by displacing the sealing lip at slightly differing positions ("toggling the sniffing position"), the precision of friction lining test point 104, 108, 204, 208 is increased by taking the mean. A further increase in the precision of determining friction lining test point 104, 108, 204, 208 can be achieved by approaching various friction lining test points. Here the friction lining wear can again be determined over various friction lining test points, and a mean value again be obtained.

Since the same actuators have slightly different properties, when an actuator is exchanged, despite the same friction lining thickness it is possible to determine a different friction lining test point 204, 208 or contact point 104, 108, so that the determination of the friction lining wear may be corrupted. In order to prevent this, the following points must be observed when exchanging an actuator during the service life. Before exchanging the actuator, the currently remaining friction lining thickness is determined via contact point 104, 108 or friction lining test point 204, 208. After exchanging the actuator, the EOL routine described above is performed again. The residual lining thickness determined prior to exchanging the actuator is assigned to the completed initial determination of contact point 104, 108 or friction lining test point 204, 208, and stored in a control device. The residual lining thickness can be input manually, or a corresponding routine for the actuator exchange is stored in the software.

Monitoring the wear of the clutch lining can also be important in vehicles having hybrid support. As a rule, in this case the wear reserve of the clutch lining is not designed to the necessary thickness for use without hybrid support, but for a certain measure of hybrid support. If this designed hybrid support cannot be fulfilled, for example because of a defective hybrid battery, a hybrid battery with insufficient capacity or a driving cycle with too frequent starts and therefore not enough time to charge the batteries, the clutch wear increases and the lining is worn out already before the vehicle reaches the end of its useful life. As described above, the driver can thus be informed in time of a need to replace the clutch.

LIST OF REFERENCE NUMBERS 100 diagram
102 earlier clutch characteristic curve
104 earlier friction lining test point
106 later clutch characteristic curve
108 later friction lining test point
110 differential value
112 prescribed clutch torque
114 earlier clutch actuation travel
116 later clutch actuation travel
200 diagram
202 earlier clutch characteristic curve
204 earlier friction lining test point
206 later clutch characteristic curve
208 later friction lining test point
210 differential value
212 prescribed clutch torque
214 earlier clutch actuation travel
216 later clutch actuation travel

What is claimed is:

1. A method for determining wear of a friction plate of an automatically actuated friction clutch, in particular in a motor vehicle driven by an internal combustion engine, the method comprising:
determining and storing an earlier clutch actuation travel (114, 214) at a prescribed clutch slip and a prescribed clutch torque (112, 212) in an earlier friction lining test point (104, 204);
determining a later clutch actuation travel (116, 216) at the prescribed clutch slip and the prescribed clutch torque (112, 212), in a later friction lining test point (108, 208);
determining a differential value (110, 210) by comparing the earlier clutch actuation travel (114, 214) and the later clutch actuation travel (116, 216) to each other; and,
determining a friction lining wear using the differential value (110, 210).

2. The method of claim 1, wherein the friction lining wear is determined using a translation ratio of a clutch actuating device.

3. The method of claim 1 further comprising the step of determining an absolute friction lining wear or a remaining friction lining thickness using a friction lining thickness in a new condition.

4. The method of claim 1, wherein a springing effect of the friction lining is included in determining the friction lining wear.

5. The method of claim 1, wherein different influencing factors may be included in each case when approaching the earlier friction lining test point and when approaching the later friction lining test point.

6. The method of claim 1, wherein the earlier friction lining test point (104) and the later friction lining test point (108) are test points that are moved to in any case, such as contact points.

7. The method of claim 1, wherein the earlier friction lining test point (204) and the later friction lining test point (208) are test points that are moved to specifically determine friction lining wear.

8. The method of claim 1 further comprising the step of determining a remaining clutch life using the ascertained friction lining wear and the mileage of the motor vehicle.

9. The method of claim 1 further comprising the step of releasing and/or storing a corresponding notification when a prescribed friction lining wear is exceeded.

10. The method of claim 1, wherein the friction lining wear is determined from a first differential value (110) and a second differential value (210), the first differential value (110) is determined from a first earlier friction lining test point (104) and a first later friction lining test point (108), and the second differential value (210) is determined from a second earlier friction lining test point (204) and a second later friction lining test point (208).

\* \* \* \* \*